US012640810B2

(12) United States Patent
Dreiling et al.

(10) Patent No.: US 12,640,810 B2
(45) Date of Patent: May 26, 2026

(54) DYNAMIC SCANNING RATES FOR SATELLITE NETWORK COVERAGE

(71) Applicant: T-Mobile USA, Inc., Bellevue, WA (US)

(72) Inventors: Ryan P. Dreiling, Shawnee, KS (US); Christopher Bailey, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 288 days.

(21) Appl. No.: 18/488,879

(22) Filed: Oct. 17, 2023

(65) Prior Publication Data

US 2025/0125866 A1 Apr. 17, 2025

(51) Int. Cl.
| | |
|---|---|
| *H04B 7/00* | (2006.01) |
| *H04B 7/185* | (2006.01) |
| *H04W 76/30* | (2018.01) |
| *H04W 84/06* | (2009.01) |

(52) U.S. Cl.
CPC ..... *H04B 7/18539* (2013.01); *H04B 7/18547* (2013.01); *H04W 76/30* (2018.02); *H04W 84/06* (2013.01)

(58) Field of Classification Search
None
See application file for complete search history.

(56) References Cited

U.S. PATENT DOCUMENTS

| | | |
|---|---|---|
| 8,108,916 B2 | 1/2012 | Fink et al. |
| 8,849,299 B2 | 9/2014 | Alfano et al. |

| | | |
|---|---|---|
| 8,909,220 B1 | 12/2014 | Aftahi et al. |
| 9,042,254 B2 | 5/2015 | Soulie |
| 9,661,602 B2 | 5/2017 | Annamalai et al. |
| 10,187,751 B2 | 1/2019 | Coutinho et al. |
| 10,225,746 B2 | 3/2019 | Mohammed et al. |

(Continued)

FOREIGN PATENT DOCUMENTS

| | | |
|---|---|---|
| CN | 104521264 A | 4/2015 |
| CN | 111264072 A | 6/2020 |

(Continued)

OTHER PUBLICATIONS

International Search Report and Written Opinion from PCT App. No. PCT/US24/051642 mailed Jan. 24, 2025, 9 pages.

*Primary Examiner* — Brandon M Renner
(74) *Attorney, Agent, or Firm* — Perkins Coie LLP

(57) ABSTRACT

Described herein are systems and methods for determining network scanning rates for electronic devices. For instance, a system can receiving a first indication that a mobile device has established a connection with a satellite. The system can determine a scanning rate for the mobile device to scan at based on whether the mobile device is located/moving close to or far from network coverage. The system can also determine the scanning rate based on a geographic region associated with the satellite, the satellite's association with a telecommunications network, a velocity of the satellite, a velocity or location of the mobile device, and the like. The system transmits instructions to the mobile device to scan for network coverage at a first rate and can determine a new rate for scanning based on the mobile device connecting to another satellite or network access node, the mobile device's position/velocity, and the like.

20 Claims, 7 Drawing Sheets

(56) References Cited

U.S. PATENT DOCUMENTS

| | | | |
|---|---|---|---|
| 10,425,832 B1 | 9/2019 | Zawadzki et al. | |
| 10,462,763 B2 | 10/2019 | Rune et al. | |
| 10,601,684 B2 | 3/2020 | Hashmi et al. | |
| 10,623,256 B2 | 4/2020 | Zawadzki et al. | |
| 10,735,962 B2 | 8/2020 | Mohammed et al. | |
| 10,939,444 B1 | 3/2021 | Bellamkonda et al. | |
| 10,993,081 B2 | 4/2021 | Mehran et al. | |
| 11,082,904 B2 | 8/2021 | Karpov et al. | |
| 11,171,719 B2 | 11/2021 | Cui et al. | |
| 11,334,921 B2 | 5/2022 | Duque De Souza | |
| 11,483,789 B2 | 10/2022 | Ryu et al. | |
| 11,510,024 B2 | 11/2022 | Patel et al. | |
| 11,751,065 B2 | 9/2023 | Khan et al. | |
| 11,758,509 B2 | 9/2023 | Bevan et al. | |
| 11,765,679 B2 | 9/2023 | Krening et al. | |
| 2012/0208515 A1 | 8/2012 | Alfano et al. | |
| 2013/0121229 A1* | 5/2013 | Vare | H04H 20/22 370/312 |
| 2013/0331114 A1 | 12/2013 | Gormley et al. | |
| 2013/0344902 A1 | 12/2013 | Cili et al. | |
| 2014/0269491 A1* | 9/2014 | Edge | H04W 72/20 370/328 |
| 2017/0176192 A1 | 6/2017 | Cardoso De Moura | |
| 2021/0058149 A1* | 2/2021 | Nuttall | H04B 7/18586 |
| 2021/0143897 A1 | 5/2021 | Edge | |
| 2021/0175961 A1* | 6/2021 | Liu | H04W 80/02 |
| 2021/0218467 A1 | 7/2021 | Jin et al. | |
| 2021/0342845 A1 | 11/2021 | Walters et al. | |
| 2023/0027869 A1 | 1/2023 | Disatnik et al. | |
| 2023/0269000 A1 | 8/2023 | Rahman | |
| 2024/0259878 A1* | 8/2024 | Chin | H04B 7/18539 |
| 2025/0105913 A1* | 3/2025 | Chen | H04W 48/16 |
| 2025/0247899 A1* | 7/2025 | Dreiling | H04W 76/10 |

FOREIGN PATENT DOCUMENTS

| | | | |
|---|---|---|---|
| CN | 107666347 B | 11/2020 |
| CN | 112564760 A | 3/2021 |
| CN | 110972257 B | 6/2021 |
| CN | 113508625 A | 10/2021 |
| CN | 109155920 B | 11/2021 |
| CN | 113647055 A | 11/2021 |
| CN | 109792705 B | 12/2021 |
| CN | 111133796 B | 2/2022 |
| EP | 1286560 A2 | 2/2003 |
| EP | 1286561 A1 | 2/2003 |
| EP | 1664970 A2 | 6/2006 |
| EP | 1754980 A1 | 2/2007 |
| EP | 2611233 B1 | 7/2014 |
| EP | 2842262 A1 | 3/2015 |
| EP | 2859748 A1 | 4/2015 |
| EP | 3406097 A1 | 11/2018 |
| EP | 3435706 A1 | 1/2019 |
| EP | 3050326 B1 | 7/2019 |
| EP | 3523733 A1 | 8/2019 |
| EP | 3443770 B1 | 1/2020 |
| EP | 3180907 B1 | 2/2020 |
| EP | 3251321 B1 | 3/2020 |
| EP | 3649812 A1 | 5/2020 |
| EP | 3689025 A1 | 8/2020 |
| EP | 3799331 A1 | 3/2021 |
| EP | 3845003 A1 | 7/2021 |
| EP | 3846555 A1 | 7/2021 |
| EP | 3533210 B1 | 10/2021 |
| EP | 3292719 B1 | 12/2021 |
| EP | 3610622 B1 | 7/2022 |
| EP | 3589979 B1 | 10/2022 |
| EP | 4207628 A1 | 7/2023 |
| JP | 4523172 B2 | 6/2010 |
| JP | 4967057 B2 | 4/2012 |
| JP | 2012515346 A | 7/2012 |
| JP | 2015523014 A | 8/2015 |
| JP | 5843960 B2 | 11/2015 |
| JP | 5925338 B2 | 4/2016 |
| JP | 5942307 B2 | 6/2016 |
| JP | 2019506801 A | 3/2019 |
| JP | 2019527965 A | 10/2019 |
| JP | 2020509619 A | 3/2020 |
| JP | 2020518886 A | 6/2020 |
| KR | 100734644 B1 | 7/2007 |
| KR | 20120069703 A | 6/2012 |
| KR | 20150027170 A | 3/2015 |
| KR | 20150032690 A | 3/2015 |
| KR | 101565352 B1 | 11/2015 |
| KR | 101588160 B1 | 1/2016 |
| KR | 101598743 B1 | 2/2016 |
| KR | 101691129 B1 | 12/2016 |
| KR | 101825538 B1 | 3/2018 |
| KR | 101982382 B1 | 5/2019 |
| KR | 20200071777 A | 6/2020 |
| WO | 0051374 A1 | 8/2000 |
| WO | 2005024545 A2 | 3/2005 |
| WO | 2007084165 A2 | 7/2007 |
| WO | 2013163429 A1 | 10/2013 |
| WO | 2013184968 A1 | 12/2013 |
| WO | 2014035597 A2 | 3/2014 |
| WO | 2014041092 A1 | 3/2014 |
| WO | 2014160805 A1 | 10/2014 |
| WO | 2015044868 A1 | 4/2015 |
| WO | 2016119841 A1 | 8/2016 |
| WO | 2017127279 A1 | 7/2017 |
| WO | 2017178038 A1 | 10/2017 |
| WO | 2017205715 A1 | 11/2017 |
| WO | 2017221481 A1 | 12/2017 |
| WO | 2018019362 A1 | 2/2018 |
| WO | 2018026262 A2 | 2/2018 |
| WO | 2018071086 A1 | 4/2018 |
| WO | 2018103855 A1 | 6/2018 |
| WO | 2018158125 A1 | 9/2018 |
| WO | 2018191638 A1 | 10/2018 |
| WO | 2019063170 A1 | 4/2019 |
| WO | 2019133103 A1 | 7/2019 |
| WO | 2020144572 A1 | 7/2020 |
| WO | 2021108120 A2 | 6/2021 |
| WO | 2021126030 A1 | 6/2021 |
| WO | 2021221736 A2 | 11/2021 |
| WO | 2021230784 A1 | 11/2021 |

* cited by examiner

300

Start

302
Receive indication of connection with satellite

304
Transmit instructions to scan at first rate

306
Receive indication of connection with network access node

308
Transmit instructions to scan at second rate

End

500

DYNAMIC SCANNING RATES FOR SATELLITE NETWORK COVERAGE

BACKGROUND

The most common example of a cellular network is a mobile phone (cell phone) network. A mobile phone is a portable telephone which receives or makes calls through a cell site (base station) or other access point that communicates via a telecommunications network. In a cellular network, a land area to be supplied with radio service is divided into cells in a pattern dependent on terrain and reception characteristics. These cell patterns roughly take the form of regular shapes, such as hexagons, squares, or circles although hexagonal cells are conventional. Each of these cells is assigned with multiple frequencies (e.g., f1-f6) which have corresponding radio base stations. The group of frequencies can be reused in other cells, provided that the same frequencies are not reused in adjacent cells, which could cause co-channel interference. All of the cell sites are connected to telephone exchanges (or switches), which in turn connect to the public telephone network. In cities, each cell site may have a range of up to approximately ½ mile (0.80 km), while in rural areas, the range could be as much as 5 miles (8.0 km). It is possible that in clear open areas, a user may receive signals from a cell site 25 miles (40 km) away. In rural areas with low-band coverage and tall towers, basic voice and messaging service may reach 50 miles (80 km), with limitations on bandwidth and number of simultaneous calls.

In cellular telecommunications, handover, or handoff, is the process of transferring an ongoing call or data session at a mobile phone from one channel connected to the core telecommunications network to another channel. The most basic form of handover is when a phone call in progress is redirected from its current cell (called source) to a new cell (called target). A mobile phone may also have its service transferred from one cell to another cell within a home network if the signal strength is too weak. In some instances, the mobile phone can move into a cell associated with a second telecommunications system and uses its services, provided that the second telecommunications network allows visiting users on its network. However, this may require licenses or agreements between operators of the telecommunications networks or increased fees paid by the operator of the mobile device's home telecommunications network to the operator of the second telecommunications network for the services compared to services from a partner network of the home telecommunications network.

BRIEF DESCRIPTION OF THE DRAWINGS

Detailed descriptions of implementations of the present invention will be described and explained through the use of the accompanying drawings.

Figure 1:
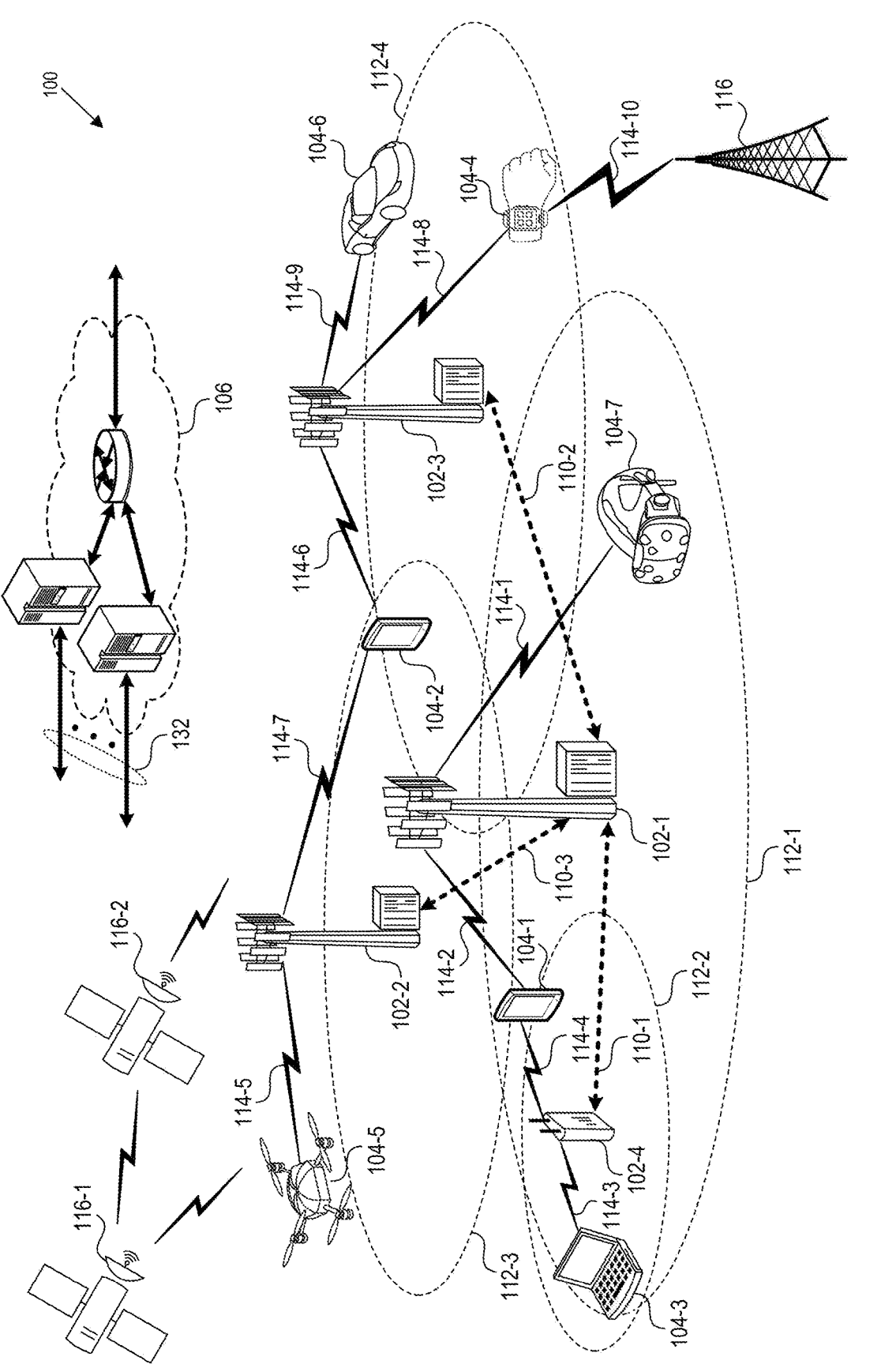
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Network coverage has conventionally been provided by network access nodes located on the ground. For example, individuals can use wireless or electronic devices like cell phones to make calls, send text messages, and browse the internet when in range of a network access node that provides network coverage. In recent years, network coverage has expanded to include coverage provided by satellites. These satellites orbit the Earth and link terrestrial networks (e.g., the network access nodes) to extraterrestrial networks of other satellites. Given their positioning above the Earth, satellites are able to provide network coverage to geographic areas that are not within network coverage of any terrestrial network access nodes. However, satellites' transmissions may have more degradation, experience higher latency, and be more susceptible to atmospheric conditions and signal blockage than that of network access nodes. Further, the costs associated with providing network coverage via satellites are considerably higher than those of network access nodes.

The systems and methods disclosed herein enable dynamic determination of scanning rates for finding network coverage. In particular, the system can receive indications from electronic devices describing what access node (either a network access node or satellite) the electronic devices are receiving network coverage from. The system may be programmed with select scanning rates to prioritize switching electronic devices' connections from satellites to network access nodes and/or switching electronic devices' connections to access nodes associated with a home telecommunications network. Based on an access node indicated by the indication, the system can determine whether an electronic device is near or moving towards network coverage provided by a satellite or network access node. The system can select a scanning rate for the electronic device based on this determination—for example, the system may select an above average (or otherwise "fast") scanning rate when the electronic device is connected to a satellite that provides coverage near a network access node such that the electronic device may quickly connect to the network access node, rather than the satellite, once it moves within range of the network access node. In another example, the system may select a below average (or otherwise "slow") scanning rate when the electronic device is connected to a satellite that provides coverage outside of a threshold distance from a network access node, thus allowing the electronic device to save power that would be spent scanning despite the electronic device being unlikely to find a network access node to connect to, as well as providing other benefit.

The system may further select a scanning rate based on association (or lack thereof) of network access nodes and satellites to the telecommunications network. For instance, the system may select a fast scanning rate when an electronic device appears to be moving into range of a satellite associated with the telecommunications network and a slow scanning rate when the electronic device appears to be moving into range of a satellite not associated with the telecommunications network (e.g., that provides network coverage for a third-party system). Similarly, the system may increase an electronic device's scanning rate if the electronic device appears to be moving from a geographic area that receives network coverage from a third-party system to a geographic area that receives network coverage from a satellite of a system partnered (e.g., in a coverage-sharing agreement with) the telecommunications network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Dynamic Scanning Rate Broadcasting

Figure 2:
FIG. 2 is a block diagram that illustrates a manager node capable of dynamically determining scanning rates, according to some embodiments.
Figure 2:

FIG. 2 is a block diagram that illustrates a manager node 210 capable of dynamically determining and broadcasting scanning rates, according to some embodiments. The environment 200 includes an electronic device 202 that is communicatively coupled to one or more networks 204 via network access nodes 206-1 and 206-2 (referred to collectively as network access nodes 206) and/or a satellite 212.

The electronic device 202 (which may be wireless device 104 from FIG. 1) is any type of electronic device that can communicate wirelessly with a network node and/or with another electronic device in a cellular, computer, and/or mobile communications system. Examples of the electronic device 202 includes smartphones (e.g., Apple iPhone, Samsung Galaxy), tablet computers (e.g., Apple iPad, Samsung Note, Amazon Fire, Microsoft Surface), wireless devices capable of M2M communication, wearable electronic devices, movable IoT devices, and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more buses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

Each network access node 206 can be associated with a geographic area that the network access node 206 provides network coverage for. The geographic areas can be shaped as one or more types of polygons (or circles) encompassing all or a portion of a geographic range that a network access node 206 associated with a respective geographic area can provide connection and signals within. For example, a network access node 206-1 may be able to send and receive signals a mile in any direction. In this example, the geographic area of the network access node 206-1 may be a circular area with a radius of one mile and the network access node 206-1 at its center or may be a square-shaped area that fits within the circular area (e.g., does not have a diagonal larger than two miles). The geographic areas can form a grid covering a geographic region that encompasses the geographic areas. For example, a geographic area may be shaped as a hexagon that borders six other hexagonal geographic areas. The network access node 206 of the geographic area may provide network coverage (e.g., connection to the network 204) associate with the manager node 210, while the network access nodes 206 of the border geographic areas may not provide such network coverage. Identifiers of network access nodes 206 associated with respective geographic areas and/or systems (e.g., the telecommunications network 100, a third-party system, etc.) can be stored in a connection database at the manager node 210.

Satellite 212 can create a communication channel between a wireless device (e.g., electronic device 202) and the network 204. Though only one satellite 212 is shown in FIG. 2, any number of satellites may communicate with electronic devices and the network 204 or may be another high-altitude platform or non-terrestrial network. The satellite 212 can be very high up in the atmosphere, typically between 100 km to 40,000 km above the Earth's surface, resulting in high attenuation of the signal between the electronic device 202 and the satellite 212. The satellite 212 may appear stationary at the same point in the sky such that the satellite dish antennas (not shown in FIG. 2) of ground stations can be aimed permanently at that spot and do not have to move to track the satellite. In some instances, the satellite 212 may be in low Earth orbit, resulting in the antennas on the ground needing to follow the position of the satellite 212 and switch between satellites as they move in and out of range. The satellite 212 can be associated with a geographic area that the satellite 212 provides network coverage to. The geographic area may be included in the grid of geographic areas in the geographic region or may be overlaid on other geographic areas in the grid. The geographic area may change as the satellite 212 moves, and the satellite 212 may communicate its location with the manager node 210, which dynamically updates the connection database to indicate a current version of the satellite's geographic area based on its location. The satellite 212 can connect to the Internet (and network 204) via broadband data connections. This can be very useful for users of electronic devices 202 who are located in remote areas and cannot access a broadband connection or require high availability of services.

The network 204 can include a 5G network, as described in relation to FIG. 1. The network 204 can include connection servers 208, which facilitate the telecommunications network 100 and connections between electronic devices 202 and network access nodes 206, and a manager node 210. For example, the manager node 210 can include hardware or software components associated with the functioning of the network access node 206-2, including storage, processors, or other components as described in relation to FIG. 5. The manager node 210 can include media capable of managing scanning rates based on coverage received at the electronic device 202. For instance, the electronic device 202 may use network access node 206-1 or network access node 206-2 (e.g., terrestrial coverage) to communicate with the network 204 or use satellite 212 (e.g., extraterrestrial coverage) to communicate with the network 204. In some instances, the manager node may be located at the satellite 212.

In some embodiments, the manager node 210 can initiate and/or terminate network connections associated with the network access nodes 206 and/or satellite 212. For example, the manager node 210 can terminate or instantiate a network connection with the electronic device 202 based on information relating to the electronic device 202 and/or associated applications. Alternatively, an electronic device 202 can determine to terminate or instantiate a network connection with a network access node 206. In some instances, the connection servers 208 initiate and terminate connections based on scans made by the electronic device, which are done at a scanning rate determined by the manger node 210.

The manager node 210 receives information describing the electronic device's 202 network connection(s). Though the following is described in relation to manager node 210, in other instances, connection servers 208 perform some of the actions used to determine and broadcast scanning rates. The manager node 210 can receive indications from the electronic device 202. An indication can describe what network access node 206 or satellite 212 (henceforth collectively referred to as connection nodes) the electronic device 202 has established connection with. For example, the manager node 210 can receive an indication that the electronic device 202 has established an RRC connection with network access node 206-1. The indication may include whether the electronic device 202 is receiving network coverage from the telecommunications network 100 or a third-party network (also referred to as a third-party system herein) or the manager node 210 can determine which network is providing the coverage based on the connection node. For example, the manager node 210 can access a connection database that stores associations between connection nodes and networks/systems and determine that the connection node provides network coverage from the telecommunications network.

In some instances, the manager node 210 can determine, based on associations within the connection database, that the connection node primarily provides network coverage for a first network and provides back-up coverage for partner networks of the first network, including the telecommunications network. For example, the electronic device 202 can be configured to prioritize connecting to a connection node that provides network coverage from the telecommunications network 100 over other connection nodes that do not. However, the electronic device 202 may be unable to connect to such a connection node due to distance. If the electronic device 202 cannot connect to such a connection node, the electronic device 202 may prioritize connecting to a connection node of a partner system before connecting to a connection node of another third-party system. For example, the telecommunications network 100 can be associated with one or more partner networks that have agreed to provide network coverage for each other's electronic devices at a lower cost or with speedier network connection. In contrast, using network coverage from a non-partner system may provide the electronic device 202 with less stable or slower network coverage and require a higher cost for the telecommunications system.

The indication can include a geographic location of the electronic device 202. For example, the indication may include Global Positioning System (GPS) coordinates of the electronic device 202 captured when the indication was sent. In some instances, the manager node 210 can access GPS coordinates of a geographic area associated with the connection node described by the indication from the connection database. Geographic area may be a portion of space that the connection node provides network coverage to. Some geographic areas are portions of space that do not have any network coverage, description of which may also be stored in the connections database. The geographic areas may remain consistent, such that of a a network access node 206 that stays in a permanent geographic location or a satellite 212 that pivots or otherwise adjusts its positioning to maintain network coverage to a consistent geographic area. Some geographic areas of the connection nodes may overlap or be distinct. For example, a first network access node 206-1 may provide network coverage to a first geographic area and a second network access node 206-2 may provide network coverage to a second geographic area that includes a portion of the first geographic area. In this example, both the first network access node 206-1 and the second network access node 206-2 can provide network coverage to the overlapping portion.

The manager node 210 can determine a scanning rate for the electronic device 202 based on the connection node identified by the indication. The manager node 210 may choose a higher (e.g., faster than average or faster than a default) scanning rate when the electronic device 202 is in communication with a satellite 212 compared to when the electronic device is in communication with a network access node 206. For example, network connection via a satellite 212 may cost more and be less stable than network connection via a network access node 206, so the electronic device 202 may benefit from connecting with a new network access node 206 rather than maintain network connection through a satellite 212. In another example, the electronic device 202 may enjoy oy similar benefits from receiving network connection through a connection node that is partnered with the telecommunications system as opposed to a connection node of a third-party system, which may provide more expensive and/or slower network coverage.

By scanning faster, the electronic device 202 can communicate with a new connection node more quickly than when scanning at a lower scanning rate. For example, the manager node 210 may select a scanning rate of six minutes and transmit instructions to the electronic device 202 to use that scanning rate. In response, the electronic device 202 will scan for connection nodes 206 every six minutes. Thus, the electronic device 202 may find a new connection node 206 to connect to after a few scans, whereas if the electronic device 202 only scanned once an hour, the electronic device 202 may miss an opportunity to switch away from receiving network connection via the satellite 212.

The manager node 210 can also determine the scanning rate based on the geographic area associated with the connection node. For instance, the manager node 210 can compare the geographic area of the connection node described in the indication to a map of a geographic region. The manager node 210 may determine that the geographic area is surrounded by other geographic areas that provide network coverage for the telecommunications system or is within a threshold distance from one or more of the other geographic areas. The manager node 210 may determine that the likelihood that the electronic device 202 will be unable to receive network coverage is low since the electronic device 202 would traverse into another geographic area with network coverage upon leaving its current geographic region. In response, the manager node 210 may select a high scanning rate, such that the electronic device 202 can quickly switch between connection nodes when traversing the geographic region. Alternatively, the manager node 210 may determine that the geographic area is outside of a threshold distance from other geographic areas that provide network coverage and select a low scanning rate, allowing the electronic device 202 to save battery that may have been otherwise spent scanning without being likely to find a connection node.

The manager node 212 can select a scanning rate based on a combination of the geographic region and the connection node of the indication being a satellite 212. For example, the geographic area where the satellite 212 provides network coverage may move as the satellite 212 moves. The manager node 210 can query the satellite 212 (or another server or system that maintains communication with the satellite 212) for the current geographic area that the satellite 212 is providing network coverage to. The manager node 210 may update the geographic area associated with the satellite in the area database to include the current geographic area and a time that the satellite was providing network coverage to the current geographic area. The manager node 210 can compare the geographic area to the map of the geographic region. The manager node 210 may select a higher scanning rate for a geographic area that is within (partially or entirely) a threshold distance to another connection node and a lower scanning rate for a geographic area outside of the threshold distance from a connection node. For example, the manager node 210 can select a low scanning rate for when the geographic area in a forest that is over 20 miles from another connection node (or geographic area of another connection node). This allows the electronic device 202 to save battery power that might have been spent scanning for network connections that cannot be made until the electronic device 202 out of the forest.

The manager node 210 can determine the scanning rate based on the location of the electronic device 202. The manager node 210 can receive the location of the electronic device 202 with the indication and compare the location to the map of the geographic region. The manager node 210 can determine whether the location is within a threshold distance of another geographic region that provides network coverage. For example, the manager node 210 may determine that the electronic device 202 is located close to an edge of a geographic area with network coverage from a network access node 206 and select a high scanning rate so that the electronic device 202 can quickly switch to receiving network coverage from the network access node 206 once the electronic device 202 is within the geographic area. In another example, the manager node 210 can select a low scanning rate upon determining that the location is outside of a threshold distance from a network access node 206 or from a geographic area associated with a satellite 212.

The manager node 210 can also determine the scanning rate based on a velocity of the electronic device 202. The manager node 210 can receive a velocity of the electronic device 202 in the indication or can determine a velocity of the electronic device based on the location. For instance, the manager node 210 request a second location of the electronic device 202 and determine the electronic device's velocity based on the location in the indication, a time when the indication was sent/received, the second location, and the time that the second location was requested/received. The manager node 210 can map the electronic device's potential route to the map of the geographic region and determine whether the electronic device is moving towards geographic areas that provide more or less network coverage. The manager node 210 may select a higher scanning rate if the electronic device 202 is moving towards dense network coverage compared to a lower scanning rate if the electronic device 202 is moving away from dense network coverage. For example, the manager node 210 may determine that though the electronic device 202 is near an edge of the geographic area that borders a second geographic area with low network coverage, the electronic device 202 is moving towards a third geographic area with network coverage provided by the telecommunications system. In response, the manager node 210 may select the higher scanning rate based on the presumption that the electronic device 202 will traverse towards/into the third geographic area.

The manager node 210 can also select the scanning rate based on strength of the signal from connection node at the electronic device 202. For example, the indication may include the signal strength of signals form a satellite 212 to the electronic device 202. The manager node 210 may select a lower scanning rate when the signal strength is low in order to allow the electronic device 202 to save battery rather than scanning for signals that it may be unable to receive (due to the low signal strength). In contrast, the manager node 210 may select a higher canning rate when the signal strength from the satellite 212 is high. This allows the electronic device 202 to scan for other connection nodes so that the electronic device 202 can sever its connection with the satellite and establish connection with an access node 206 or a satellite 212 partnered with the telecommunications system. In this instance, even if the electronic device 202 does not find another connection node to receive network coverage through, the electronic device 202 can fall back on receiving network coverage from the satellite 212.

The manager node 210 sends the selected scanning rate to the electronic device 202 with instructions for the electronic device 202 to scan for connection nodes at the scanning rate. The manager node 210 may send the scanning rate in spare bits related to the network connection or other transmissions being sent to the electronic device 202. When the satellite 212 is using an LTE network, the manager node 210 may send or instruct the satellite 212 to send the scanning rate in RRC Connection Release spare bits. The manager node 210 may also store the scanning rate in association with the indication in the connection database such that the manager node 210 can reference previously-selected scanning rates when determining a scanning rate for a new indication. The manager node 210 may request a new indication periodically or based on a triggering event, such as determining that a connection node is not operating properly. The manager node 210 can determine and send instructions to scan at a new scanning rate based on the requested new indication or upon receiving a new indication from the electronic device 202.

Figure 3:
FIG. 3 is a flow diagram that illustrates a process for changing a scanning rate of an electronic device based on network coverage, according to some embodiments.
Figure 3:
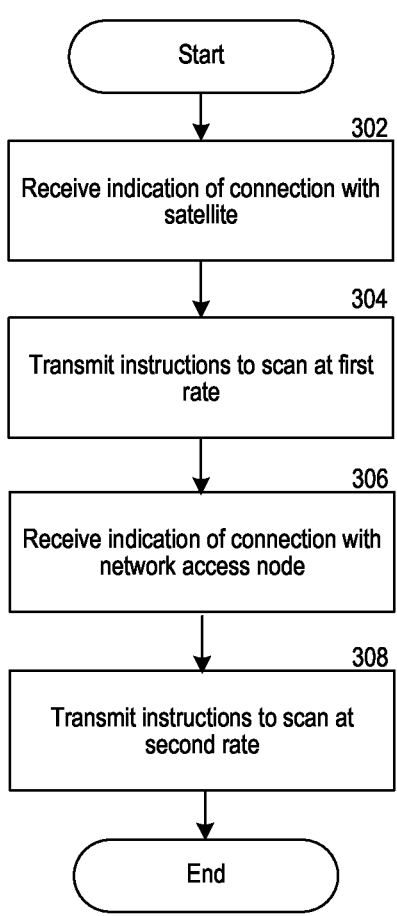

FIG. 3 is a flow diagram that illustrates a process 300 for changing a scanning rate of an electronic device 202. Though described in relation to the components of FIG. 2, the following process 300 may be performed using other components or systems. Further, in additional or alternative embodiments, the process may involve steps other than those shown in FIG. 3.

At step 302, the manager node 210 receives a first indication that the electronic device 212 has established a connection with a satellite 212. In some instance, the indication may describe that the electronic device has initiated or maintained the connection with the satellite 212 or that the electronic device 202 is otherwise receiving network coverage via the satellite 212. The satellite may be associated a first geographic area that the satellite provides network coverage to. The first geographic area may be a fixed area in a geographic region that the satellite 212 regularly provides network coverage to or may change based on positioning of the satellite.

The manager node 210 can determine a first rate based on the indication. The manager node 210 can determine a geographic area associated with the satellite 212, a location of the electronic device 202, a velocity of the electronic device 202, a velocity of the satellite 212, and the like, as described above in relation to FIG. 2. The manager node 210 can select based on electronic device 202 receiving network coverage from a satellite 212. For instance, the manager node 210 may select the first rate to be over a threshold rate (e.g., an average or default scanning rate) so that the electronic device 202 will scan for a connection node to switch its connection to in order to stop receiving network coverage from the satellite 212 once feasible. The manager node 210 may also select the first rate based on strength of signals the electronic device 02 is receiving from the satellite 212. For example, the manager node 210 may request the signal strength from the electronic device 202 or satellite 212 and select the first rate to be below the threshold rate if the signal strength is below a threshold strength.

The manager node 210 may additionally or alternatively select the first rate based on the geographic area associated with the satellite 212. For instance, the manager node 210 can compare a location of the geographic area to the locations of other geographic areas or connection nodes in a geographic region. The manager node 210 may select the first rate to be over the threshold rate if the geographic area is, wholly or partially, within a threshold distance of one or more geographic areas, network access nodes 206, or other satellites 212. The manager node 210 may select the first rate to be at or below the threshold rate if the geographic area is, wholly or partially, outside of the threshold distance of one or more geographic areas, network access nodes 206, or other satellites 212. The manager node may select the first rate by making the same comparisons using the location of the electronic device 202 rather than, or in addition to, the geographic area.

The manager node 210 may additionally or alternatively select the first rate based on one or more systems associated with the geographic area. For instance, the manager node 210 may select a higher rate if the satellite is associated with a third-party system than if the satellite 212 is associated with the telecommunications system or one of its partners. Thus, the electronic device, when scanning at the first rate, will look for a new connection node more often in cases where the satellite is associated with a third-party system. The manager node 210 may additionally or alternatively select the first rate based on a velocity of the electronic device 202. For instance, the manager node 210 may use the velocity with the mostly recently received location of the electronic device 202 to chart a path of the electronic device 202. The path may be straight line in the direction of the velocity or may be estimated based on roads and trails shown in the map of the geographic region. The manager node 210 may select the first rate to be over the threshold rate if the path extends into a geographic area with network coverage than if the path extends into a geographic area that does not have network coverage. The manager node 210 may also select the first rate to be over the threshold rate if the path extends into a geographic area associated with the telecommunications system than if the path extends into a geographic area not associated with the telecommunications system or one of its partner systems. The manager node 210 may also select the first rate to be over the threshold rate if the path extends into a geographic area associated with a partner of the telecommunications system than if the path extends into a geographic area associated with a third-party system.

At step 304, the manager node 210 transmits instructions to the electronic device 202, via the satellite 212, for the electronic device 202 to scan at the first rate for network access nodes. The instructions may indicate to scan only for network access nodes 206 so that the electronic device 202 only switches its network connection to a network access node 206 and not another satellite 212 or may indicate to scan for both network access nodes 206 and satellites 212. The electronic device 202 may be programmed to prioritize making connections with network access nodes 206 over satellites, connection nodes associated with the telecommunications system over other connection nodes, connection nodes associated with partners of the telecommunications system over connections nodes associated with third-party systems not partnered with the telecommunications system, and the like. The manager node 210 can additionally or alternatively include these priorities in the instructions with the first rate.

At step 306, the manager node 210 receives a second indication that the electronic device 202 has established a connection with a network access node 206. The network access node 206 may be associated with a second geographic area in the geographic region that the network access node provides network coverage to. The second indication can also include the location of the electronic device and/or a strength of signals being received by the electronic device 202 from the network access node 206. The manager node 210 can determine a location of a geographic area associated with the network access node 206, one or more systems that provide network coverage via the network access node 206, and/or a velocity of the electronic device 202.

The manager node 210 can determine a second rate for the electronic device 202 to scan for connection nodes at. The manager node 210 can select the second rate based on the second geographic region. For example, the manager node 210 can select the second rate to be lower than the first rate due to the second geographic region being further away, in total or on average, from network coverage compared to the first geographic region. The manager node 210 may select the second rate to be lower than the first rate due to the electronic device 202 switching from network connection via a satellite to network connection via a network access node, which may be preferable for the telecommunications system. The second rate may be above the threshold rate due to the velocity of the electronic device 202 indicating it is moving towards more favorable (e.g., provided by the telecommunications system or one of its partners or near areas with a lot of) network coverage. At step 308, the manager node transmits instructions to the electronic device 202 to scan at the second rate.

In some embodiments, the manager node 210 may perform additional or alternative steps to those shown or described in relation to FIG. 3. In some instances, the manager node 210 may select the first rate to be faster than the second rate based on the first geographic area being within a threshold distance of network coverage of a telecommunications network 100 and the second geographic area not being within the threshold distance. In some instances, the first indication can include a first location of the electronic device 202 at a first time and the second indication can include a second location of the electronic device 202 at a second time. The manager node 210 may determine that the electronic device 202 is traversing the geographic region based on the first and second locations. The manager node 210 may select the second rate to be higher than the first rate if the electronic device 202 is traversing the geographic region. In some embodiments, the manager node 210 may select the first and second rates based on the first and second locations. For example, the manager node 210 may select a higher rate to correspond to a location within a threshold distance of an edge of a geographic area and a lower rate to correspond to a location within a threshold distance of a center of a geographic area.

In some instances, the electronic device is associated with a telecommunications network 100 that does not provide network coverage to the first geographic area via the satellite. The manager node 212 may select the second rate to be higher than the first if the second region is associated with the telecommunications system or one of its partner systems. In some instances, the manager node 210 may select the second rate to be the same as the first rate if the first and second geographic areas are associated with the same system(s). The manager node 210 may also select the first rate to be the same as the second rate when the electronic device 202 traverses from between geographic areas that receive network coverage from the same type of connection nodes (e.g., satellite 212 to satellite 212 or network access node to network access node).

In some instances, the manager node 210 may determine that the satellite 212 is moving and dynamically update coordinates of first geographic area in the connection database. The manager node 210 can associate the coordinate of the first geographic are with a time of the update and a range of locations of the satellite 212 when it provided network coverage to the first geographic area. In some instances, the manager node 210 may determines that the velocity of the satellite 212 is in the opposite direction of the velocity of the electronic device 202 and, in response, transmit instructions to the mobile device to scan at a third rate. The third rate may be lower than the first rate if the electronic device 202 is not located within a threshold distance for network coverage or higher than the first rate of the electronic device 2-02 is within the threshold distance of network coverage, either in general, from the telecommunications system, or a partner system.

Figure 4A:
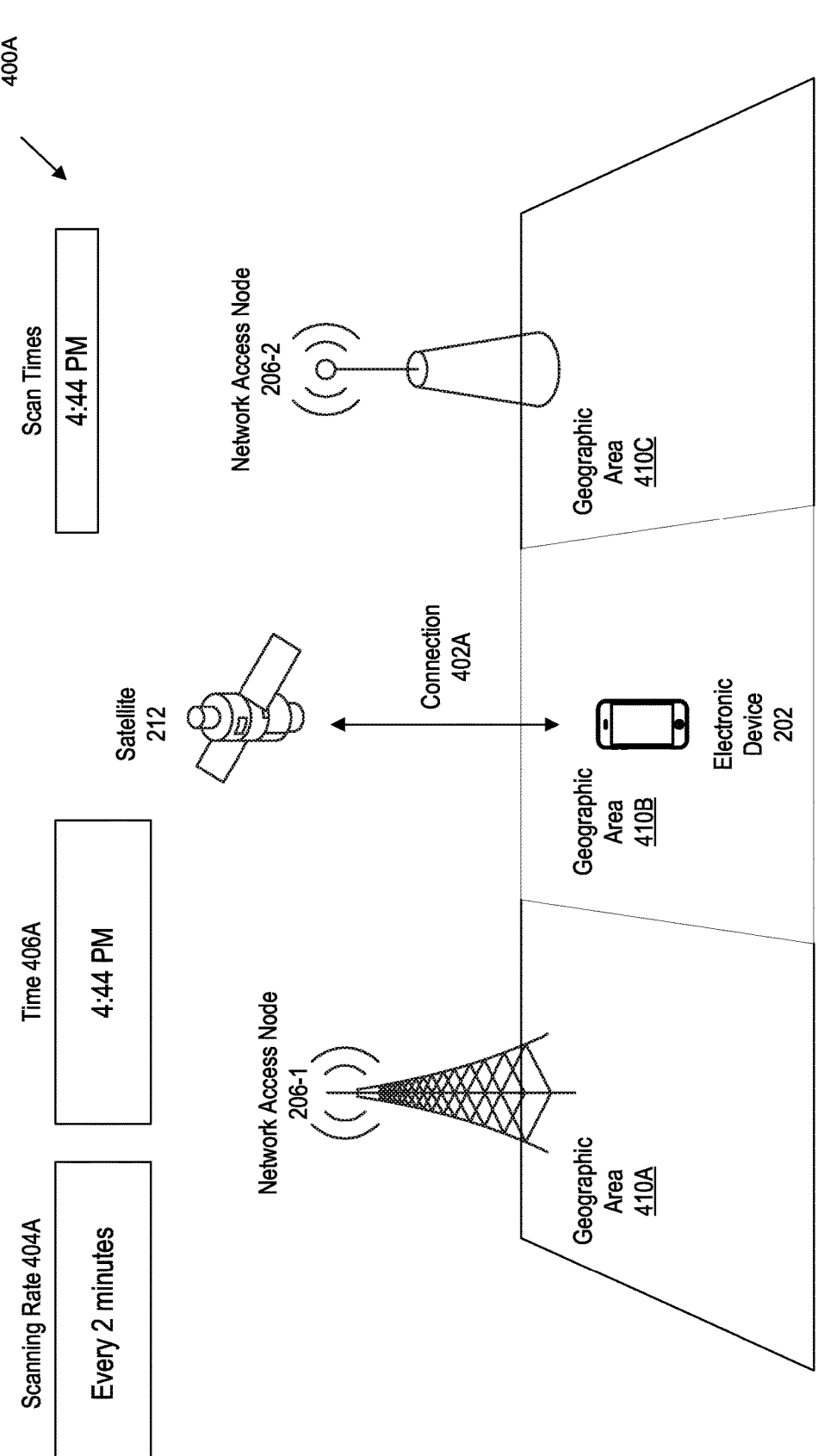
FIG. 4A is a block diagram of representing an electronic device connected to a satellite, according to some embodiments.

FIG. 4A is a block diagram 400A representing an electronic device 202 connected to a satellite 212. The manager node 210 instructed the electronic device 202 to scan at a scanning rate 404A of two minutes, and the electronic device 202 last scanned at 4:44 PM 406A, resulting in a connection 402A to the satellite 212. Given the proximity of the geographic area 410B of the satellite 212 to geographic areas of two network access nodes 206, the manager node selected the scanning rate 404A to be two minutes (above an average of five minutes in this example) so that the electronic device 202 will be frequently looking for new connection nodes when the electronic device 202 is likely to traverse into a geographic area 410 of a preferable connection node. Here, a network access node 206 is considered preferable to the satellite 212 because the network access node 206 provides cheaper, more stable, and stronger network coverage than the satellite 212.

Figure 4B:
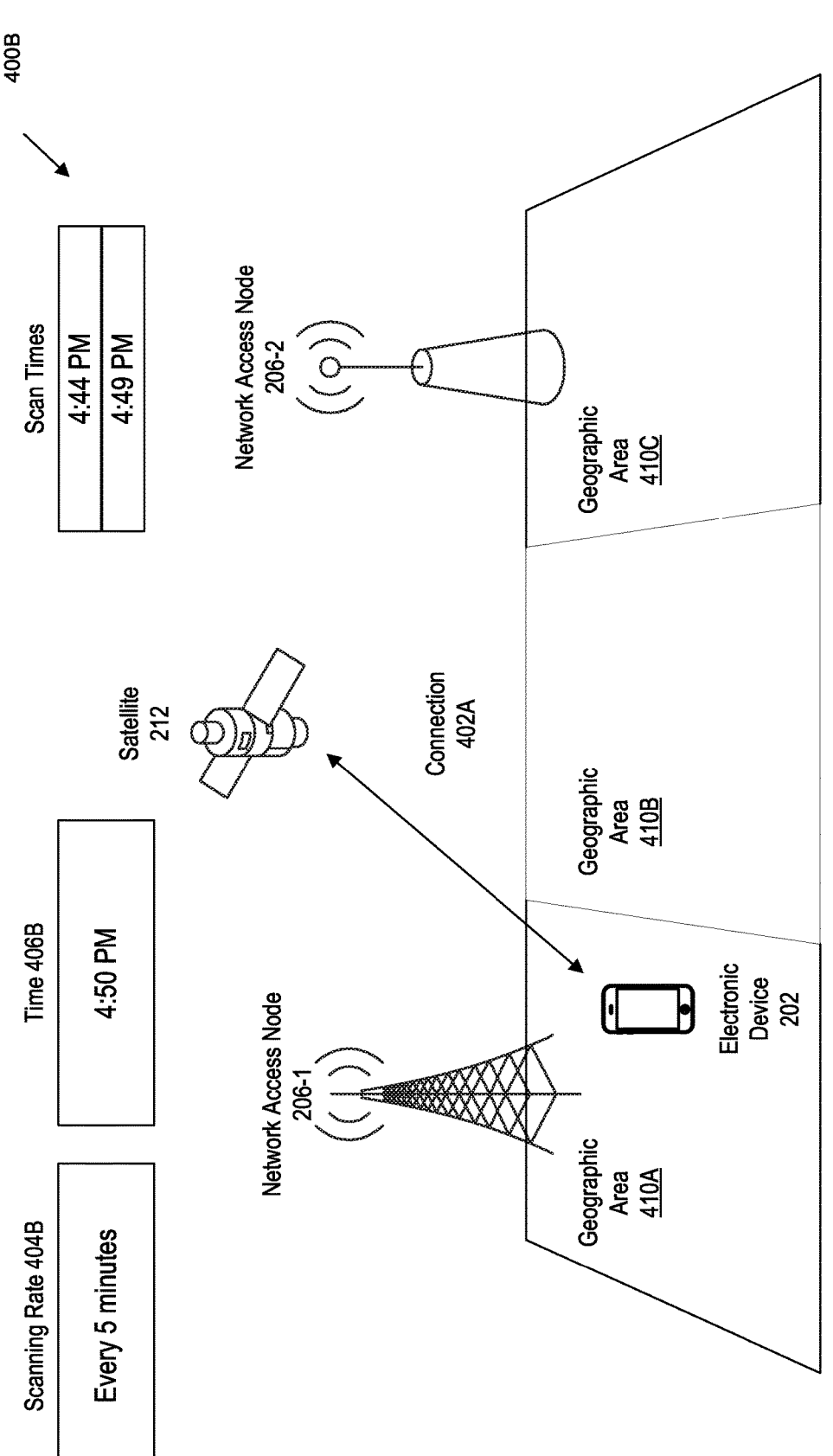
FIG. 4B is a block diagram representing an electronic device being in range of, but not connected to, to a network access node, according to some embodiments.

FIG. 4B is a block diagram representing the electronic device 202 being in range of, but not connected to, to the network access node 206-1, such as when the scanning rate 404B of the electronic device 202 is managed by a conventional system. In this figure, the electronic device 202 is configured to scan at an average scanning rate 404B of five minutes and last scanned for connection nodes at 4:49 PM. However, the electronic device 202 was located in the geographic area 410B of the satellite 212 at 4:49 PM. Even though the electronic device 202 is now (at 4:50 PM 406B) located in the geographic area 410A of the network access node 206-1, the electronic device 202 will not scan for connection nodes for another four minutes and will maintain its connection 402A with the satellite 212 at least until then. The electronic device 202 is thus missing the opportunity to switch a preferable connection with the network access node 206-1 given its signal stability and cost benefits compared to the satellite 212.

Figure 4C:
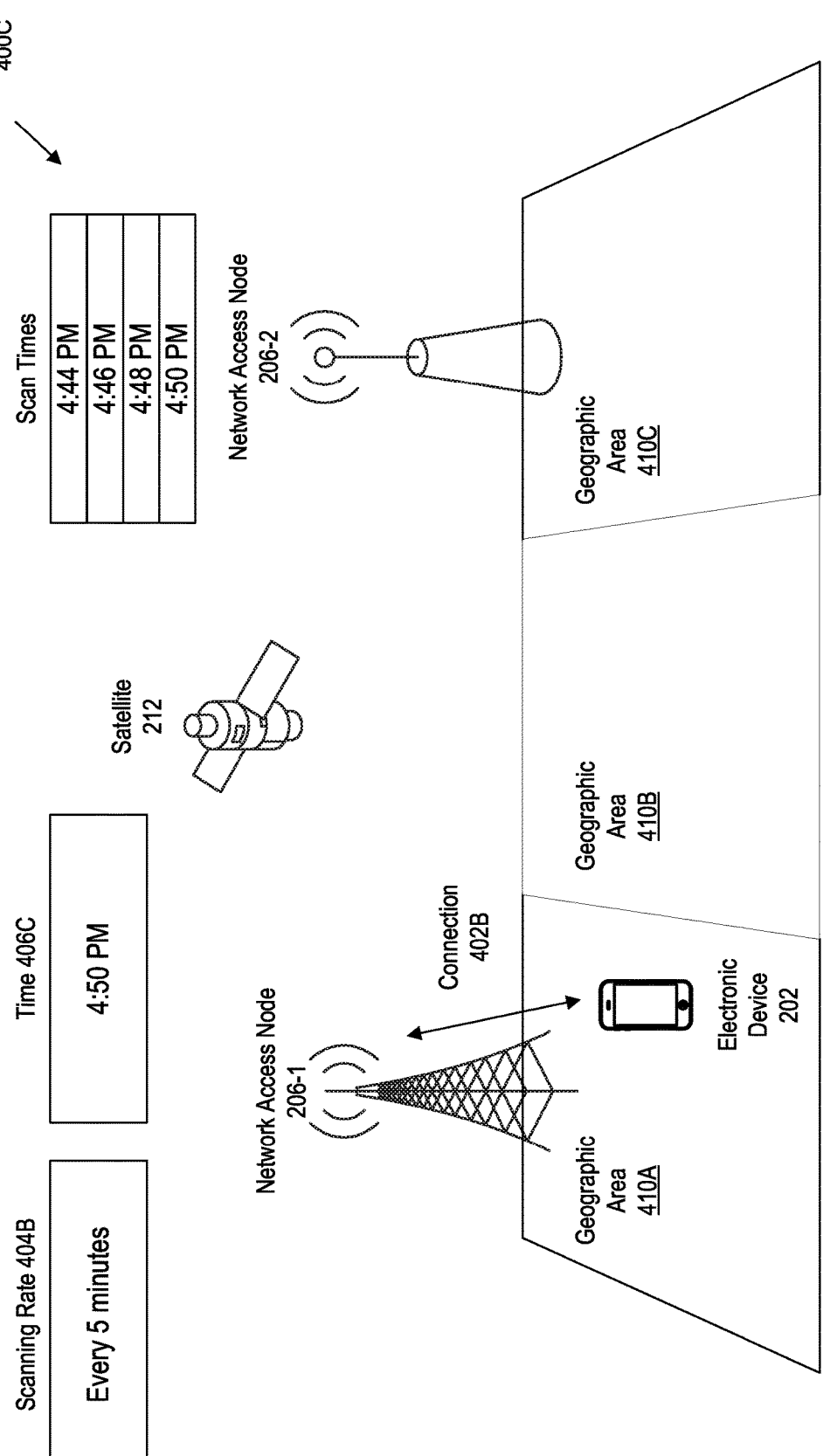
FIG. 4C is a block diagram of an electronic device connected to a network access node, according to some embodiments.

FIG. 4C is a block diagram 400C representing the electronic device 202 connected to the network access node 206-1. As shown in the figure, the electronic device 202 scanned every two minutes until it severed its connection 402A with the satellite 212 and established a connection 402B with the network access node 206-1. The manager node 212 instructed the electronic device 202 to scan at a slower scanning rate 404B to save battery since the manager node 212 is not prioritizing finding a non-satellite connection for the electronic device 202 given its new connection 402B with the network access node 206-1. Thus, by changing the scanning rate 404 based on the connection 402A and geographic areas 410, the manger node 210 helped the electronic device 202 establish a preferable connection 402B sooner than the conventional system of FIG. 4B.

In another example, the electronic device 202 is in the geographic area 410B but moving into an adjacent geographic area (not shown) that has no network coverage. The manager node 210, upon determining that the electronic device 202 has a velocity indicating it may traverse into the adjacent geographic area, selects a slower than average scanning rate 404 of 30 minutes. That way, the electronic device 202 is not wasting power to frequently scanning for connection nodes in a geographic area that has none. The manager node 210 may select an even slower rate if the other geographic areas 410 adjacent to the electronic device also did not have connection nodes or may select a faster rate if the adjacent geographic area is relatively small and otherwise surrounded by connection nodes.

Computer System

Figure 5:
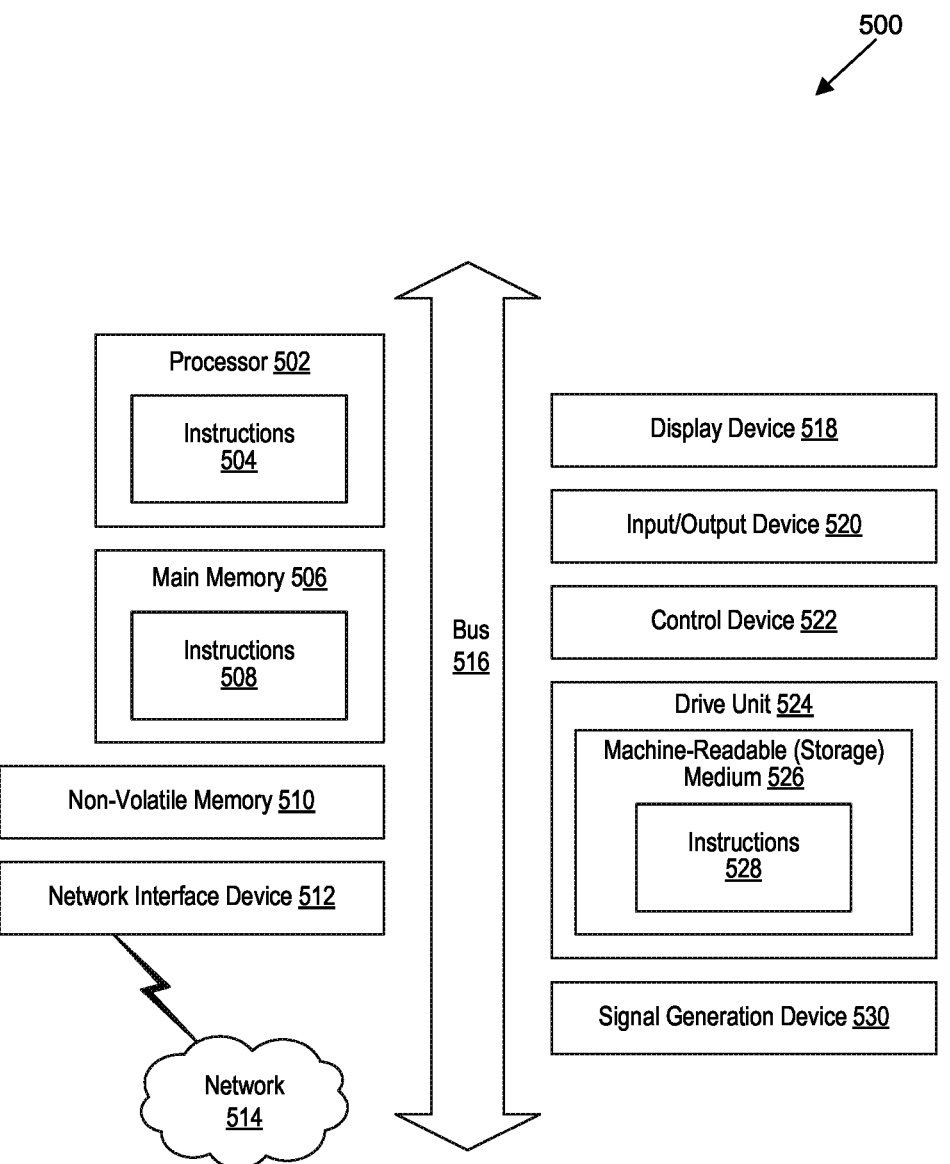
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a system, cause the system to perform actions comprising:

receiving a first indication that a wireless mobile device has established a connection with a satellite, wherein the satellite is associated with a first geographic area that the satellite provides network coverage to;

transmitting, via the satellite, instructions to the mobile device to scan for network access nodes at a first rate, wherein the first rate is determined based on the geographic area associated with the satellite;

receiving, via a network access node, a second indication that the mobile device has established a connection with a proximate, terrestrial network access node, wherein the network access node is associated with a second geographic area that the network access node provides network coverage to; and responsive to receiving the second indication, transmitting instructions to the mobile device to scan for network access nodes a second rate, wherein the second rate differs from the first rate.

2. The non-transitory, computer-readable storage medium of claim 1, wherein the second rate is determined based on the location of the second geographic area in a geographic region.

3. The non-transitory, computer-readable storage medium of claim 1, wherein the first geographic area is within a threshold distance of wireless network coverage of a terrestrial telecommunications network and the first rate is faster than the second rate, wherein the first rate causes the mobile device to expend more battery power than the second rate.

4. The non-transitory, computer-readable storage medium of claim 1, wherein the first geographic region is at least a threshold geographic distance from network coverage of a telecommunications network and the first rate is slower than the second rate, wherein the first rate causes the mobile device to expend less battery power than the second rate.

5. The non-transitory, computer-readable storage medium of claim 1, wherein the first indication includes a first location of the mobile device at a first time and the second indication includes a second location of the mobile device at a second time, the actions further comprising:

determining that the mobile device is traversing a geographic region based on the first and second locations, wherein the geographic region includes the first geographic area and the second geographic area.

6. The non-transitory, computer-readable storage medium of claim 3, the actions further comprising:

responsive to determining that the mobile device is within a threshold distance of an edge of the second geographic area, transmitting instructions to the mobile device to scan at a third rate.

7. The non-transitory, computer-readable storage medium of claim 1, wherein the mobile device is associated with a telecommunications network that does not provide network coverage to the first geographic area via the satellite.

8. The non-transitory, computer-readable storage medium of claim 1, the actions further comprising:

dynamically updating coordinates of first geographic area based on a current location of the satellite.

9. The non-transitory, computer-readable storage medium of claim 1, the actions further comprising:

in response to determining that a velocity of the satellite is in the opposite direction of a velocity of the mobile device, transmitting instructions to the mobile device to scan at a third rate.

10. The non-transitory, computer-readable storage medium of claim 1, wherein the first rate is further determined based on a third-party system associated with the satellite.

11. A method comprising:

receiving a first indication that a wireless mobile device has established a connection with a satellite, wherein the satellite is associated with a first geographic area that the satellite provides network coverage to;

transmitting, via the satellite, instructions to the mobile device to scan for network access nodes at a first rate, wherein the first rate is determined based on the geographic area associated with the satellite;

receiving, via a network access node, a second indication that the mobile device has established a connection with a proximate, terrestrial network access node, wherein the network access node is associated with a second geographic area that the network access node provides network coverage to; and responsive to receiving the second indication, transmitting instructions to the mobile device to scan for network access nodes a second rate, wherein the second rate differs from the first rate.

12. The method of claim 11, wherein the second rate is determined based on the location of the second geographic area in a geographic region.

13. The method of claim 11, wherein the first geographic area is within a threshold distance of wireless network coverage of a terrestrial telecommunications network and the first rate is faster than the second rate, wherein the first rate causes the mobile device to expend more battery power than the second rate.

14. The method of claim 11, wherein the first geographic region is at least a threshold geographic distance from network coverage of a telecommunications network and the first rate is slower than the second rate, wherein the first rate causes the mobile device to expend less battery power than the second rate.

15. The method of claim 11, wherein the first indication includes a first location of the mobile device at a first time and the second indication includes a second location of the mobile device at a second time, the method further comprising:

determining that the mobile device is traversing a geographic region based on the first and second locations, wherein the geographic region includes the first geographic area and the second geographic area.

16. A system comprising:

at least one hardware processor; and at least one non-transitory memory storing instructions, which, when executed by the at least one hardware processor, cause the system to perform actions comprising:

receiving a first indication that a wireless mobile device has established a connection with a satellite, wherein the satellite is associated with a first geographic area that the satellite provides network coverage to;

transmitting, via the satellite, instructions to the mobile device to scan for network access nodes at a first rate, wherein the first rate is determined based on the geographic area associated with the satellite;

receiving, via a network access node, a second indication that the mobile device has established a connection with a proximate, terrestrial network access node, wherein the network access node is associated with a second geographic area that the network access node provides network coverage to; and responsive to receiving the second indication, transmitting instructions to the mobile device to scan for network access nodes a second rate, wherein the second rate differs from the first rate.

17. The system of claim 16, wherein the second rate is determined based on the location of the second geographic area in a geographic region.

18. The system of claim 16, wherein the first geographic area is within a threshold distance of wireless network coverage of a terrestrial telecommunications network and the first rate is faster than the second rate, wherein the first rate causes the mobile device to expend more battery power than the second rate.

19. The system of claim 16, wherein the first geographic region is at least a threshold geographic distance from network coverage of a telecommunications network and the first rate is slower than the second rate, wherein the first rate causes the mobile device to expend less battery power than the second rate.

20. The system of claim 16, wherein the first indication includes a first location of the mobile device at a first time and the second indication includes a second location of the mobile device at a second time, the actions further comprising:

determining that the mobile device is traversing a geographic region based on the first and second locations, wherein the geographic region includes the first geographic area and the second geographic area.

* * * * *